(12) United States Patent
Miyaoh et al.

(10) Patent No.: US 6,851,677 B2
(45) Date of Patent: Feb. 8, 2005

(54) CYLINDER HEAD GASKET

(75) Inventors: Yoshio Miyaoh, Tokyo (JP); Kisho Yasuda, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 10/284,344

(22) Filed: Oct. 31, 2002

(65) Prior Publication Data
US 2003/0085530 A1 May 8, 2003

(30) Foreign Application Priority Data

Nov. 5, 2001 (JP) ........................................ 2001-339055

(51) Int. Cl.[7] .............................................. F02F 11/00
(52) U.S. Cl. ...................................... 277/594; 277/595
(58) Field of Search ............................. 277/592–598, 277/591

(56) References Cited

U.S. PATENT DOCUMENTS

| | | | | |
|---|---|---|---|---|
| 4,861,046 A | * | 8/1989 | Udagawa | 277/595 |
| 5,255,926 A | * | 10/1993 | Udagawa | 277/595 |
| 5,269,541 A | * | 12/1993 | Inamura | 277/595 |
| 5,435,575 A | | 7/1995 | Udagawa | |
| 5,536,024 A | * | 7/1996 | Udagawa | 277/595 |
| 5,560,623 A | | 10/1996 | Yoshino | |
| 5,711,537 A | * | 1/1998 | Inamura et al. | 277/595 |
| 5,873,577 A | * | 2/1999 | Inamura | 277/594 |
| 6,139,025 A | * | 10/2000 | Miyaoh | 277/593 |

FOREIGN PATENT DOCUMENTS

EP       1 108 925       6/2001

OTHER PUBLICATIONS

Patent Abstracts of Japan, Pub. No. 04095669, Pub. Date Mar. 27, 1992, Applicant: Toyota Motor Corp.

* cited by examiner

*Primary Examiner*—Alison Pickard
*Assistant Examiner*—Vishal Patel
(74) *Attorney, Agent, or Firm*—Manabu Kanesaka (57) ABSTRACT

A cylinder head gasket for an internal combustion engine includes a first metal plate having first holes and first beads formed around the respective first holes, and a second metal plate disposed under the first metal plate and having a second bead extending toward the first metal plate. A distance between the first and second beads or a width of at least one of the first and second beads at a high heat load portion of the cylinder bore is formed to be greater than a distance between the first and second beads or a width of at least one of the first and second beads at a low heat load portion of the cylinder bore to thereby reduce a surface pressure at the high heat load portion.

11 Claims, 9 Drawing Sheets

CYLINDER HEAD GASKET

BACKGROUND OF THE INVENTION AND RELATED ART STATEMENT

The invention relates to a cylinder head gasket having two surface plates and a bead plate, more particularly, a cylinder head gasket capable of generating an optimum surface pressure with respect to portions where heat load is high in a peripheral portion of a cylinder bore.

As a gasket for sealing joint surfaces between a cylinder head and a cylinder block of an internal combustion engine, there has been used a cylinder head gasket formed by laminating thin metal plates on which a sealing device is formed along a periphery of a hole to be sealed.

In view of demands for making an internal combustion engine small and light weight, especially a small type diesel engine, engine members, such as a cylinder head and a cylinder block, have been made of an aluminum alloy or the like with a relatively low rigidity. Since the engine has been designed to have a high output, as the pressure (Pmax) in a cylinder is increased, a high sealing ability has been required.

While satisfying the requests of the engine, to provide a proper sealing ability to a gasket, it is necessary to provide not only a first sealing device but also a second sealing device along the peripheral portion of a cylinder bore. However, to meet the demands of the small size, light weight and low cost of the engine, the number of the gasket plates to be laminated has been decreased and the sealing device to be employed has been simplified. As a metal laminate type gasket having a relatively simple structure, a metal laminate gasket including two surface plates and an intermediate plate has been practically used.

There has been proposed a metal laminate gasket including three metal plates, wherein with respect to a cylinder bore, a first sealing portion by a first bead and a second sealing portion by a second bead disposed outside the first bead are provided; and one of surface plates is folded back to protect the first and second beads from a combustion gas of a high temperature.

As an example of the gasket described above, as shown in FIGS. 9(a) and 9(b), Japanese Patent Publication (KOKAI) No. 11-118037 discloses a metal laminate type gasket 60, wherein a first outer plate 61 is folded back to the side of a second outer plate 62 to form a folded-back portion 65 for constituting a cylinder hole 64; a first bead 66 surrounding the cylinder hole 64, provided on the second outer plate 62, inside the folded-back portion 65; and an intermediate plate 63 disposed between the first and second outer plates 61, 62 outside the folded-back portion 65, and provided with a second bead 67 surrounding the folded-back portion 65. In the gasket, the tightening load is unified by changing a folded-back width LX, bead widths BX1, BX2 and bead positions RX1, RX2 according to the distance from a tightening bolt hole 68 to thereby prevent the bore from being deformed and to improve the gas sealing ability. Incidentally, in the embodiment shown in FIGS. 9(a) and 9(b), a coating film 70 is applied on both sides of the intermediate plate 63.

Figure 9A:
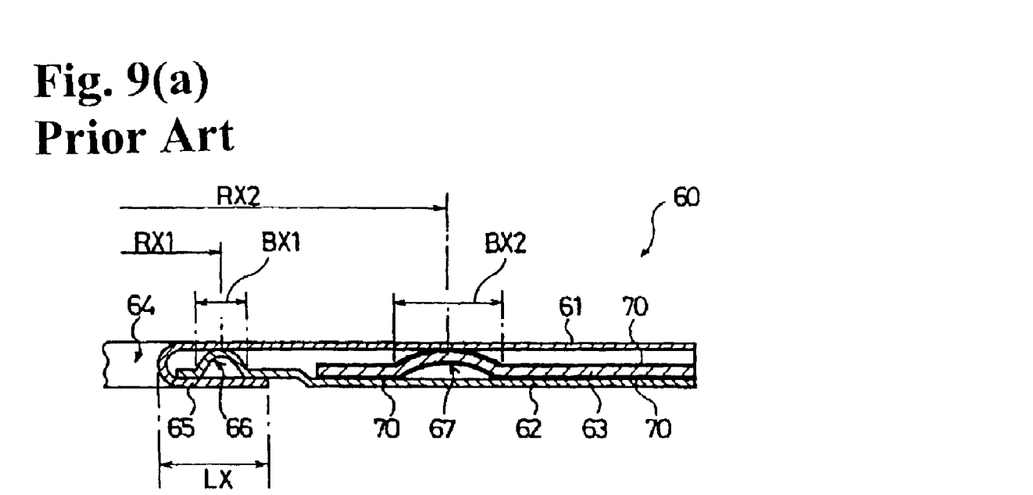
Figure 9B:
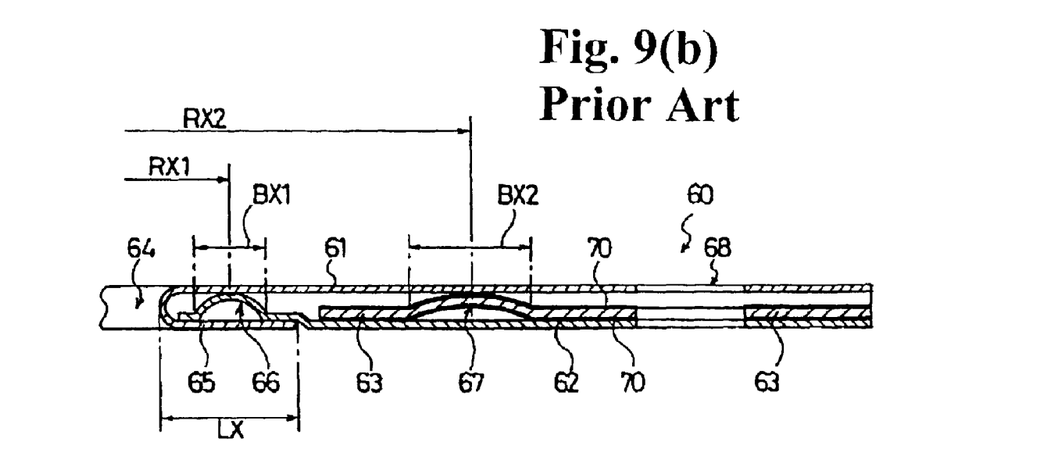

However, in the metal laminate type gasket 60, the intermediate plate 63 is disposed outside the folded-back portion 65, so that the space between the first bead 66 and the second bead 67 becomes large. Thus, there has been a problem such that, in view of the tendency of making the engine small to allow the space between the cylinder bores to become narrow, it is hard to apply the gasket to the recent engine.

Also, there has been a problem such that, in order to distribute the tightening force uniformly by tightening the bolts, deterioration of sealing ability due to heat load and heat stress, which have recently been a problem, is not sufficiently dealt with.

As the pressure in a cylinder (Pmax) of a diesel engine becomes high, the problem of the deterioration of the sealing ability by the heat load and heat stress has become the public attention. The problem arises at, for example, a portion on the central side or the exhaust manifold side of the engine where the temperature is relatively high and the heat load becomes large; or a portion where the heat load locally becomes large due to the circulation of the cooling water or the like, for example, the end portion and the exhaust side of the engine.

On these portions, the sealing surface pressure of the bead portion and the like becomes high due to increase in the heat stress by the heat load. Also, a large force is repeatedly applied to the large sealing surface pressure portions due to increase in a relative displacement, i.e. head lift, between the head gasket and the engine member during the operation of the engine. Thus, pressing marks on the engine member against which the large sealing surface pressure portions abut are increased. In other words, the engine member is locally depressed to thereby lower the gas sealing ability.

Especially, in the engine member having a relatively low rigidity as in an aluminum engine, in case a bead having a high rigidity is provided to the gasket, when the engine member is hit by the head lift vibration during the operation of the engine, the hit portion is depressed.

On the other hand, to prevent the problem, when the rigidity of the bead is lowered too much, the sealing ability is reduced. Also, since the tightening forces by the tightening bolts are fixed, it is necessary not to cause the leakage by uniformly distributing the tightening force for pressing the engine members, balancing the surface pressures of the respective sealing portions, i.e. not to cause the depressions on the engine member, and controlling to obtain sufficient surface pressures for sealing.

In view of the above problems, the present invention has been made and an object of the invention is to provide a cylinder head gasket for sealing between a cylinder head and a cylinder block, wherein rigidity of a bead is lowered with respect to portions where high surface pressure is generated by large heat load and heat stress at high temperature portions, so that the press marks on the engine member are reduced to thereby hold a high sealing ability.

Further objects and advantages of the invention will be apparent from the following description of the invention.

SUMMARY OF THE INVENTION

To attain the above objects, a cylinder head gasket according to the present invention is structured as follows.

In case a large heat load is locally generated in the heat distribution along the periphery of a cylinder bore, the cylinder head gasket of the invention is structured as follows:

1) A cylinder head gasket comprises a first surface plate, which is folded back to a second surface plate to form a cylinder bore and includes an outer peripheral side bead disposed close to an inner peripheral side bead and projecting to a bead plate; the second surface plate; and the bead plate having the inner peripheral side bead projecting to the first surface plate, and laminated on a peripheral edge portion of the second surface plate inside the folded-back portion of the first surface plate. The widths of the inner peripheral side bead and the outer peripheral side bead are partially made wide, respectively, with respect to portions where a heat load is locally high along the periphery of a cylinder bore.

According to the structure as described above, the local increase of the surface pressure generated by the heat load and heat stress can be canceled by partially widening the bead widths of the inner peripheral side bead and the outer peripheral side bead with respect to the portions where the heat load becomes locally high. Therefore, the rigidity of the beads for those portions can be reduced and press mark is not formed on an engine member to thereby prevent the sealing ability from being deteriorated.

2) A cylinder head gasket comprises a first surface plate, which is folded back to a second surface plate to form a cylinder bore and includes an outer peripheral side bead disposed close to an inner peripheral side bead and projecting to a bead plate; the second surface plate; and the bead plate having the inner peripheral side bead projecting to the first surface plate, and laminated on a peripheral edge portion of the second surface plate inside the folded-back portion of the first surface plate. The distance between the inner peripheral side bead and the outer peripheral side bead is partially made large with respect to a portion where a heat load is locally high along the periphery of a cylinder bore.

The distance between two beads is enlarged by gradually widening, without providing a step or making a sudden change, in a direction along the bead. In other words, it is preferable to hold the sealing ability in a good state by preventing a sudden change of the surface pressure in the direction along the periphery of the cylinder bore.

According to the structure as described above, the local increase of the surface pressure generated by the heat load and heat stress can be canceled by partially widening a distance between the inner peripheral side bead and the outer peripheral side bead with respect to the portion where the heat load becomes locally high. Therefore, the compression rigidity of the beads for those portions can be reduced and press mark on an engine member is not formed to thereby prevent the sealing ability from being deteriorated.

3) In the above-described cylinder head gasket, with respect to the portion where the heat load is locally high in the periphery of the cylinder bore, the distance between the inner peripheral side bead and the outer peripheral side bead is partially made wide. At the same time, at lease one or both widths of the inner and outer peripheral side beads are partially made wide.

According to the structure as described above, in addition to the reduction of the compression rigidity by enlarging the distance between the two beads, the compression rigidity can be further reduced by widening the bead width of at least one bead or both beads. Thus, the reduction in the compression rigidity and surface pressure distribution can be finely controlled.

Among the cylinder bores of a cylinder head gasket, there is a cylinder bore, the heat load of which becomes relatively high along the periphery thereof, and there is a cylinder bore, the heat load of which becomes relatively low along the periphery thereof. For example, among the cylinder bores disposed in series on the cylinder head gasket, the heat load at the periphery of the cylinder bore located in the central portion is higher than that at the periphery of the cylinder bores located on both sides of the gasket. In this case, the cylinder head gasket is structured as follows.

1) A cylinder head gasket for sealing a plurality of cylinder bores is formed of: a first surface plate, which is folded back to the side of a second surface plate to form a plurality of cylinder bores and includes an outer peripheral side bead disposed close to an inner peripheral side bead and projecting to a bead plate; the second surface plate; and the bead plate having the inner peripheral side bead projecting to the first surface plate, which is laminated on a peripheral edge portion of the second surface plate inside the folded-back portion of the first surface plate. The widths of the outer peripheral side bead and the inner peripheral side bead of the cylinder bore where the heat load is high at the peripheral portion are made wider than those of the outer peripheral side bead and the inner peripheral side bead of the cylinder bore where the heat load is low at the peripheral portions.

The bead width is widened by gradually widening, without providing a step or making a sudden change, in a direction along the bead. In other words, it is preferable to hold good sealing ability by preventing a sudden change of the surface pressure in the direction along the periphery of the cylinder bore.

According to the structure as described above, the increase of the surface pressure generated by the heat load and heat stress can be offset by making the widths of the inner peripheral side bead and the outer peripheral side bead, of the cylinder bores where the heat load is relatively high at the peripheral portions, wider than those of the inner peripheral side bead and the outer peripheral side bead of the cylinder bores where the heat load is relatively low at the peripheral portions. Therefore, the rigidity in the portions of the beads can be reduced and press mark is not formed on the engine member to thereby prevent the sealing ability from being deteriorated.

2) A cylinder head gasket for sealing a plurality of cylinder bores is formed of a first surface plate, which is folded back to the side of a second surface plate to form the plural cylinder bores and includes an outer peripheral side bead disposed close to an inner peripheral side bead and projecting to a bead plate; the second surface plate; and the bead plate having the inner peripheral side bead projecting to the first surface plate, which is laminated on a peripheral edge portion of the second surface plate inside the folded-back portion of the first surface plate. The distance between the inner peripheral side bead and the outer peripheral side bead of the cylinder bore where the heat load is high at the peripheral portions is made wider than that between the inner peripheral side bead and the outer peripheral side bead of the cylinder bore where the heat load is low at the peripheral portions.

Incidentally, while the widths of the inner peripheral side bead and the outer peripheral side bead are not changed usually, the width of one or both of the beads may be widened as the distance between the two beads is widened. This invention includes the above structure.

According to the structure as described above, the increase of the surface pressure generated by the heat load and heat stress can be offset by making the distance between the inner peripheral side bead and the outer peripheral side bead, of the cylinder bores where the heat load is relatively high at the peripheral portions, wider than that between the inner peripheral side bead and the outer peripheral side bead of the cylinder bores where the heat load is relatively low at the peripheral portions. Therefore, the rigidity in the portions of the beads can be reduced and the press mark is not formed on the engine member to thereby prevent the sealing ability from being deteriorated.

3) In the cylinder head gasket as described above, the distance between the inner peripheral side bead and the outer peripheral side bead of the cylinder bore where the heat load is high at the peripheral portion, is made wider than that between the inner peripheral side bead and the outer peripheral side bead of the cylinder bore where the heat load is low at the peripheral portions. At the same time, the width of at least one or both of the inner peripheral side bead and the outer peripheral side bead of the cylinder bore where the heat load is high at the peripheral portion, is made wider than that of the inner peripheral side bead and the outer peripheral side bead of the cylinder bore where the heat load is low at the peripheral portions.

According to the structure as described above, in addition to the reduction of the compression rigidity by widening the distance between the two beads, the compression rigidity can be further reduced by widening the bead width of at least one or both of the two beads. Thus, reduction in the compression rigidity, i.e. reducing amount thereof, and surface pressure distribution can be finely adjusted.

According to the structure of the respective cylinder head gaskets as described above, the outer peripheral side bead is disposed outside the inner peripheral side bead close thereto, and the projecting portions of both beads face each other. Thus, both beads can be disposed in a relatively narrow space to thereby meet the demand of forming the engine small and effectively seal with the double sealing lines.

Also, since both beads are disposed adjacent to each other and face each other, the surface pressures of both beads can be easily balanced and the rigidities of both beads can be easily adjusted.

In the respective cylinder head gaskets as described above, the bead plate and the first surface plate are formed so that the edges of the outer peripheral side of the bead plate and the folded-back portion of the first surface plate are positioned outside the center of the outer peripheral side bead.

According to the structure as described above, since the heights of the outer peripheral side bead and the inner peripheral side bead are equal and both beads are positioned on the folded-back portion, the heights of both beads can be made equal.

In the respective cylinder head gaskets as described above, the height and width of the inner peripheral side bead are formed to be the same as those of the outer peripheral side bead.

According to the structure as described above, since both beads are formed to have substantially the same shape, parameters for reducing the rigidities of the beads can be narrowed to a common bead width from the respective bead widths. Thus, the design of the gasket can be facilitated.

Also, in the respective cylinder head gaskets as described above, the inner peripheral side bead and the outer peripheral side bead may be formed so that the distance between the center of the inner peripheral side bead and the center of the outer peripheral side bead is larger than a half of the sum of the width of the inner peripheral side bead and the width of the outer peripheral side bead.

According to the structure as described above, the foot portions of the inner peripheral side bead and the outer peripheral side bead are prevented from overlapping each other, and it is facilitated to presume a relationship between the increase of the bead width and the reducing quantity of the bead rigidity.

Further, in the respective cylinder head gaskets as described above, the thickness of the first surface plate is made thicker than that of the bead plate. With the structure, the folded-back portion can also be made thicker, so that the inner peripheral side bead and the outer peripheral side bead therein can be effectively protected, and the damage caused by the bending process can be prevented.

Also, in the respective cylinder head gaskets as described above, the widths of the inner peripheral side bead and the outer peripheral side bead are changed in a range of 1.0 to 2.0 times, preferably, 1.0 to 1.25 times with respect to the minimum bead width. When the width of the beads is changed in a range larger than the above-stated range, the balance of sealing surface pressures by the beads becomes worse.

BRIEF DESCRIPTION OF THE DRAWINGS

FIGS. 1(a) and 1(b) are sectional views of a first embodiment of a cylinder head gasket according to the invention, wherein FIG. 1(a) shows a portion where a heat load is low, and FIG. 1(b) shows a portion where the heat load is high;

FIGS. 3(a) and 3(b) are sectional views of another example of the cylinder head gasket of the first embodiment, wherein FIG. 3(a) shows a portion where the heat load is low, and FIG. 3(b) shows a portion where the heat load is high;

FIGS. 4(a) and 4(b) are sectional views of a cylinder head gasket of the second embodiment, wherein FIG. 4(a) shows a portion where the heat load is low, and FIG. 4(b) shows a portion where the heat load is high;

FIGS. 5(a) and 5(b) are sectional views of a cylinder head gasket of the third embodiment according to the invention, wherein FIG. 5(a) shows a peripheral portion of the cylinder bore where the heat load is low, and FIG. 5(b) shows a peripheral portion of the cylinder bore where the heat load is high;

FIGS. 7(a) and 7(b) are sectional views of another example of the cylinder head gasket of the third embodiment, wherein FIG. 7(a) shows a peripheral portion of a cylinder bore where the heat load is low, and FIG. 7(b) shows a peripheral portion of the cylinder bore where the heat load is high;

FIGS. 8(a) and 8(b) are sectional views of the fourth embodiment of a cylinder head gasket according to the present invention, wherein FIG. 8(a) shows a peripheral portion of the cylinder bore where the heat load is low, and FIG. 8(b) shows a peripheral portion of the cylinder bore where the heat load is high; and FIGS. 9(a) and 9(b) are sectional views showing a conventional cylinder head gasket, wherein FIG. 9(a) shows a portion apart from a tightening bolt, and FIG. 9(b) shows a portion close to the tightening bolt.

DETAILED DESCRIPTION OF THE PREFERRED EMBODIMENTS

Next, with reference to the accompanying drawings, embodiments of a cylinder head gasket according to the invention will be explained.

Incidentally, FIGS. 1(a) through 9(b) are explanatory schematic views. A plate thickness, a dimension of a bead and a length to width ratio of the cylinder head gasket are different from the actual ones for a demonstration purpose.

As shown in FIGS. 1(a) through 8(b), cylinder head gaskets 1A through 1F of the embodiments according to the present invention are metal cylinder head gaskets to be installed between a cylinder head and a cylinder block (both not shown) of an engine, respectively. Each of the metal cylinder head gaskets 1A to 1F seals a combustion gas with a high temperature and high pressure in a cylinder bore and a fluid, such as a cooling water passing through a cooling water path, and a cooling oil passing through a cooling oil path.

The cylinder head gasket 1A (1B–1F) of the first to fourth embodiments according to the invention is formed of a first surface plate 10, a second surface plate 20, a bead plate 30 and an intermediate plate 40, respectively. The first and second surface plates 10 and 20 are made of a material such as soft steel and annealed stainless steel, and the bead plate 30 and the intermediate plate 40 are made of a material such as spring steel.

The first surface plate 10 is folded back to the side of the second surface plate 20 to form a hole 50 (50A, 50B) for a cylinder bore. The bead plate 30 is provided with an inner peripheral side bead 31 (31A, 31B) projecting toward the first surface plate 10, and is laminated on a peripheral edge portion 21 of the second surface plate 20. The bead plate 31 is covered by the folded-pack portions 12, 13 of the first surface plate 10.

Also, the first surface plate 10 is provided with an outer peripheral side bead 11 (11A, 11B) projecting toward the bead plate 30, close to the outer periphery of the inner peripheral side bead 31 (31A, 31B). In other words, the projecting side of the inner peripheral side bead 31 (31A, 31B) is disposed to face the projecting side of the outer peripheral side bead 11 (11A, 11B) each other.

Further, the bead plate 30 and the first surface plate 10 are formed such that an outer peripheral side edge 34 of the bead plate 30 and the edge 14 of the folded-back portion of the first surface plate 10 are positioned outside the center 11c(11Ac, 11Bc) of the outer peripheral side bead 11 (11A, 11B).

The inner peripheral side bead 31 (31A, 31B) and the outer peripheral side bead 11 (11A, 11B) are positioned with an appropriate clearance or space C (CA, CB) therebetween, so that when they are pressed during operation of the engine, the foot portions of both beads do not overlap to deform each other.

The second surface plate 20 includes an inclined portion 22 gradually inclining toward the outer peripheral side from the overlapping portion with the folded-back portion 13. The intermediate plate 40 has a half bead 41, and is positioned on an outer side than the outer peripheral side bead 11 (11A, 11B) to thereby keep a space between the first surface plate 10 and the second surface plate 20, i.e. a thickness of the cylinder head gasket 1A (1B–1F).

First Embodiment

Figure 1A:
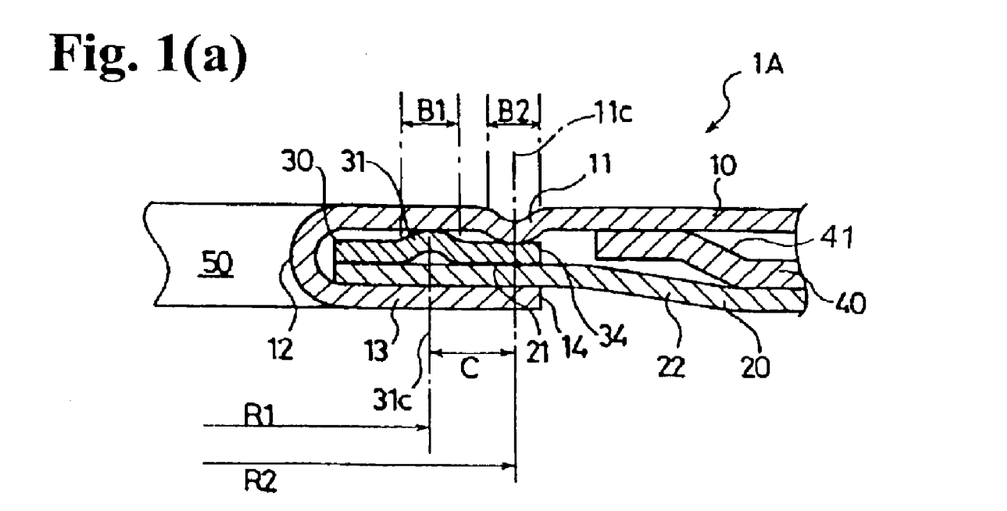
Figure 1B:
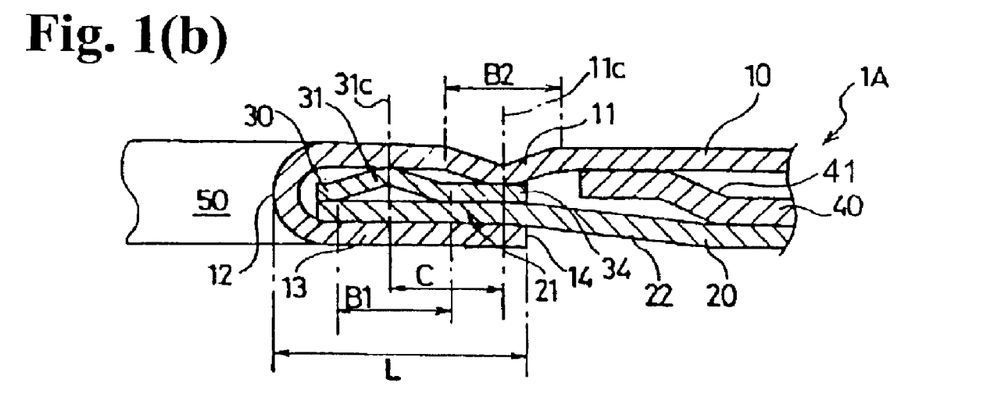

In the first embodiment of the invention, as shown in FIGS. 1(a) and 1(b), a bead width B1 of the inner peripheral side bead 31 and a bead width B2 of the outer peripheral side bead 11 are formed to be partially and gradually wider at a position where the heat load is locally high along the periphery of the cylinder bore 50. FIG. 1(a) shows a structure of the portion where the heat load does not become high, while FIG. 1(b) shows a structure of the portion where the heat load becomes high.

Figure 2A:
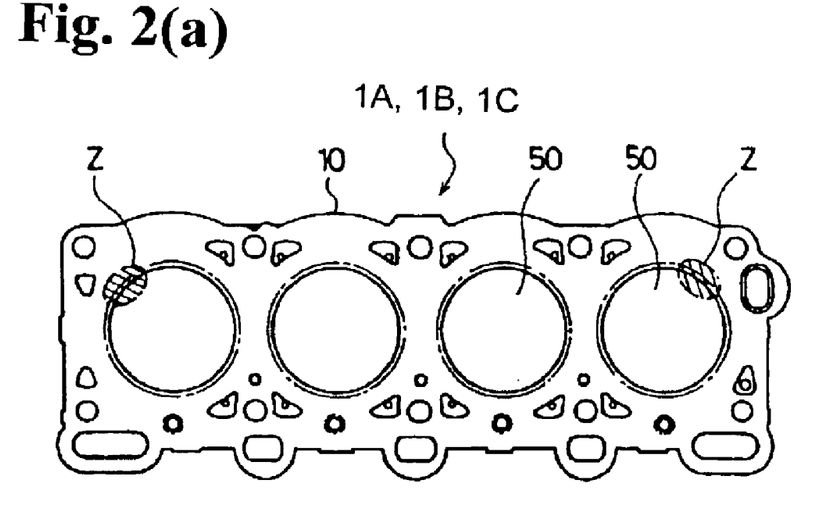
FIGS. 2(a) and 2(b) are plan views showing portions, where the heat loads are high, of the first and second embodiments of the cylinder head gaskets according to the invention.
Figure 2B:
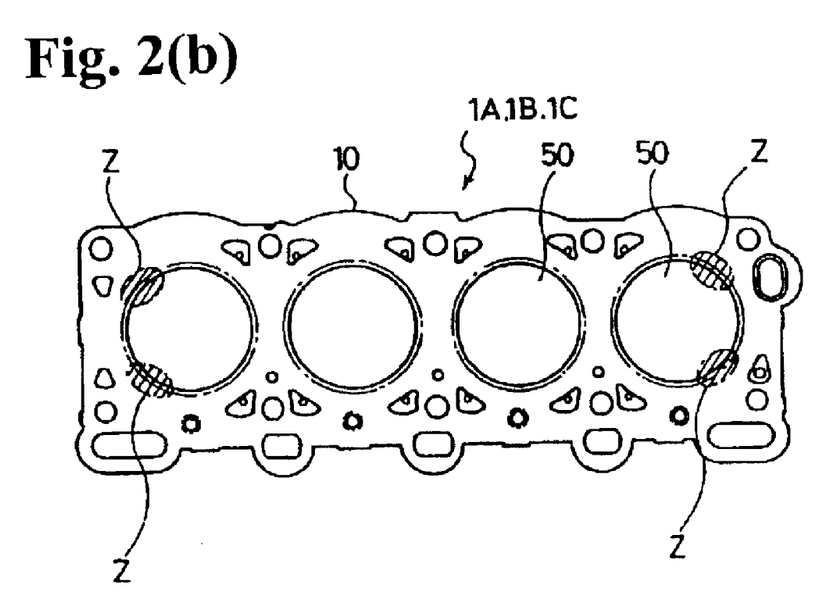

While the portion where the heat load becomes locally high is different depending on a type of an engine, FIG. 2(a) shows portions where the heat load is locally high. In a four cylinder engine as shown in FIG. 2(a), the heat load becomes locally high at two oblique line portions Z of the cylinder bores 50 on both exhaust sides. Also, as shown in FIG. 2(b), the heat load becomes high locally at two oblique line portions Z of the cylinder bores 50 on both exhaust sides and at two oblique line portions Z of the cylinder bores 50 on both inlet sides.

According to the structure as described above, in the portion Z where the heat load becomes locally high, the bead width B1 and the bead width B2, of the inner peripheral side bead 31 and the outer peripheral side bead 11 which are disposed to face each other and are located inside the folded-back portion of the first surface plate 10, are widened. Therefore, the rigidity of the bead is reduced and the surface pressure is also decreased.

With the reduction of the surface pressure, the bead rigidity can be set at a lower value with respect to the portion Z where the heat stress is increased by the high heat load and the surface pressure becomes high. Thus, it is possible to prevent the high surface pressure from being locally generated at the portion Z, which leads to prevention of the head collapse.

Further, without providing any step portion to the bead widths B1, B2, i.e. gradual widening, instead of sudden widening, of the bead widths B1, B2 in the peripheral direction of the cylinder bore 50, it is possible to prevent the surface pressure from being suddenly changed in the direction along the beads 11, 31, i.e. in the peripheral direction of the cylinder bore 50 to thereby maintain good sealing ability.

Incidentally, as an example of the dimension of the beads, with respect to the cylinder bore 50 with a diameter of 89 mm, in case a thickness of the first surface plate 10 is 0.275 mm, a thickness of the second surface plate 20 is 0.1 to 0.3 mm and a thickness of the bead plate 30 is 0.25 mm, the height of both beads 11, 31 is 0.3 mm, and the bead widths B1, B2 change in a range of 1.2 mm–1.5 mm. Also, a distance R1 between the center 31c of the inner peripheral side bead 31 and the center of the cylinder bore 50 is changed in a range of 46.15 mm–45.65 mm; and a distance R2 between the center 11c of the outer peripheral side bead 11 and the center of the cylinder bore 50 is set at 67.15 mm and is not changed. A length L of the folded-back portions 12, 13 is 3 mm.

Incidentally, in FIGS. 1(a) and 1(b), the inner peripheral side bead 31 and the outer peripheral side bead 11 are disposed with an appropriate clearance or space C therebetween so that the foot portions of the beads 31, 11 do not interfere with each other. However, assuming that a bead width of the inner peripheral side bead 31 is B1, a bead width of the outer peripheral side bead 11 is B2 and a distance between the center 31c of the inner peripheral side bead 31 and the center 11c of the outer peripheral side bead 11 is C, in FIG. 1(a), a half of the sum of B1 and B2 is smaller than C, i.e. $((B1+B2)/2<C)$. On the other hand, in FIG. 1(b), a half of the sum of B1 and B2 is larger than C, i.e. $((B1+B2)/2>C)$.

In the gasket as shown in FIGS. 1(a) and 1(b), since the distance R2 between the center 11c of the outer peripheral side bead 11 and the center of the cylinder bore 50 is fixed, the relationship $((B1+B2)/2>C)$, as shown in FIG. 1(b), takes place. However, the gasket may be structured such that the relationship $((B1+B2)/2>C)$ can take place all the time. In other words, as the bead widths B1, B2 of the respective beads 31, 11 are increased, the distance R2 between the center 11c of the outer peripheral side bead 11 and the center of the cylinder bore 50 is increased to thereby shift the center 11c to the outer peripheral side, as shown in FIG. 3(b).

Figure 3A:
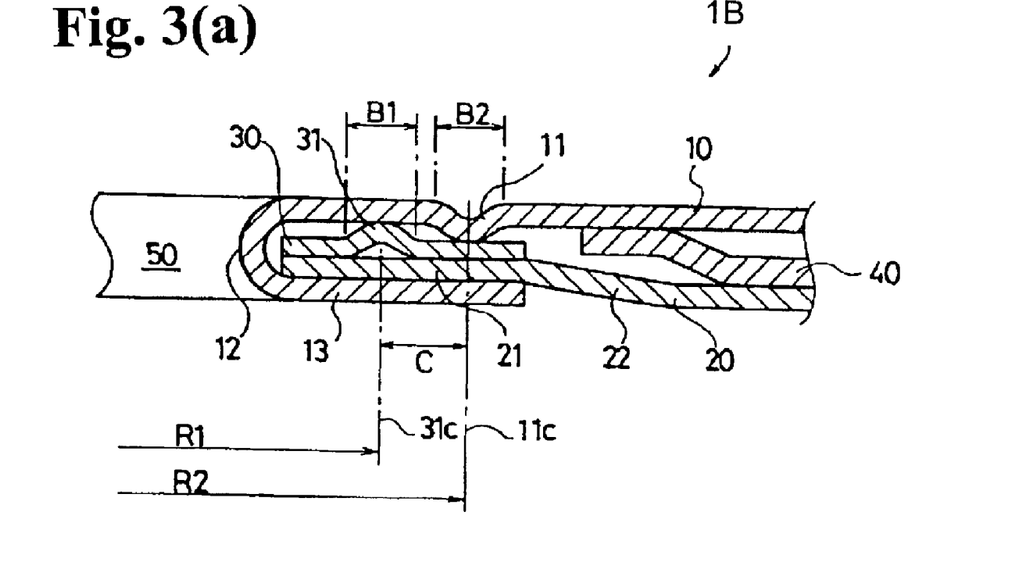
Figure 3B:
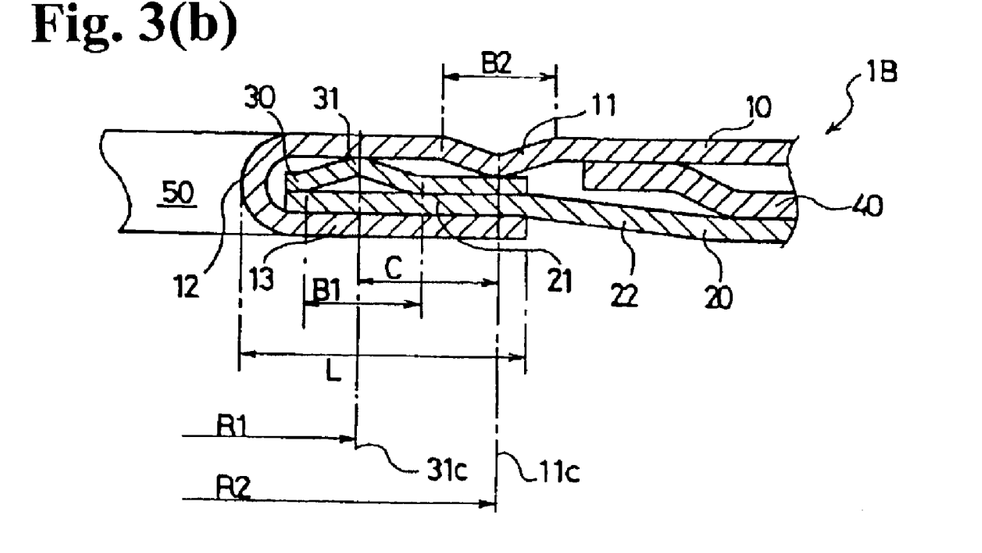

In case of FIGS. 3(a) and 3(b), even if the cylinder head gasket 1B is strongly pressed during operation of the engine, since the beads 31, 11 are separated from each other, it is possible to prevent the foot portions of the respective beads from overlapping each other.

Second Embodiment

Next, a cylinder head gasket 1C of a second embodiment of the invention will be explained.

Figure 4A:
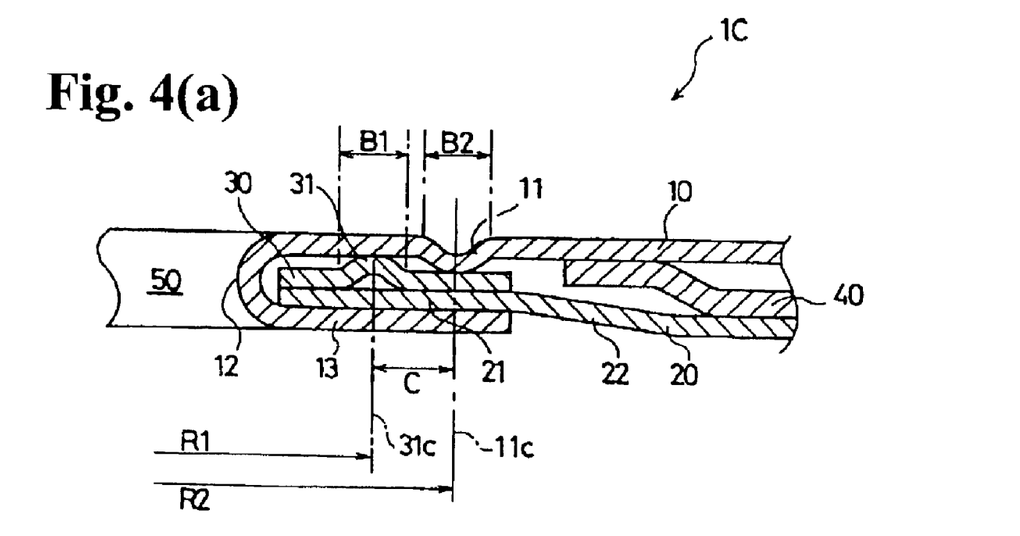
Figure 4B:
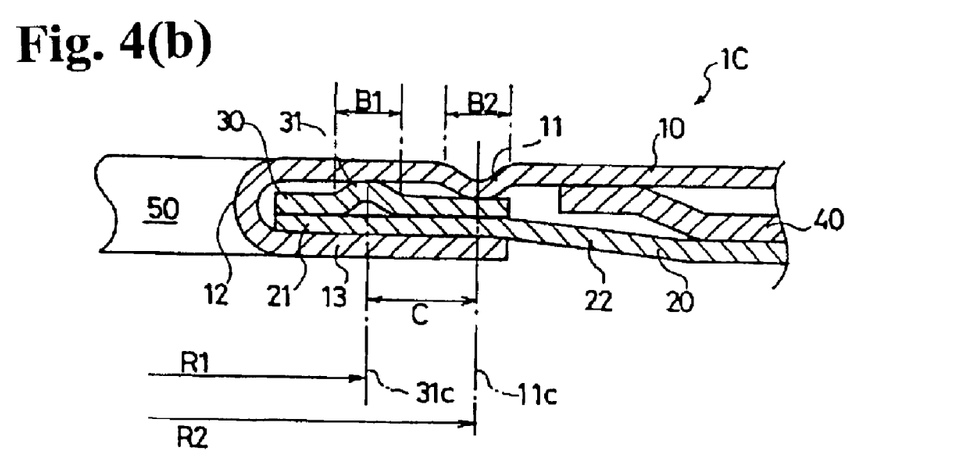

In the gasket 1C of the second embodiment, instead of changing the bead widths B1, B2 of the inner peripheral side bead 31 and the outer peripheral side bead 11 with respect to the portion Z where the heat load increases locally, as shown in FIGS. 4(a) and 4(b), a distance C between the inner peripheral side bead 31 and the outer peripheral side bead 11 is partially and gradually enlarged. The gasket of the second embodiment is the same as that of the first embodiment except for the structure as described above.

In the second embodiment, the clearance or space C between the inner peripheral side bead 31 and the outer peripheral side bead 11 is partially enlarged with respect to the portion Z where the heat load is locally high, so that the space between the bead 31 and the bead 11, facing each other inside the folded-back portion of the first surface plate 10, is widened, and the compression rigidity and the surface pressure in the portion formed of the two beads are reduced.

With the locally reduced surface pressure, the increase of the surface pressure generated by the heat load and heat stress at the portion Z where the heat load is locally high can be offset from each other. Thus, deterioration of the sealing ability due to the press marks formed on the engine member can be prevented.

Third Embodiment

Figure 6:
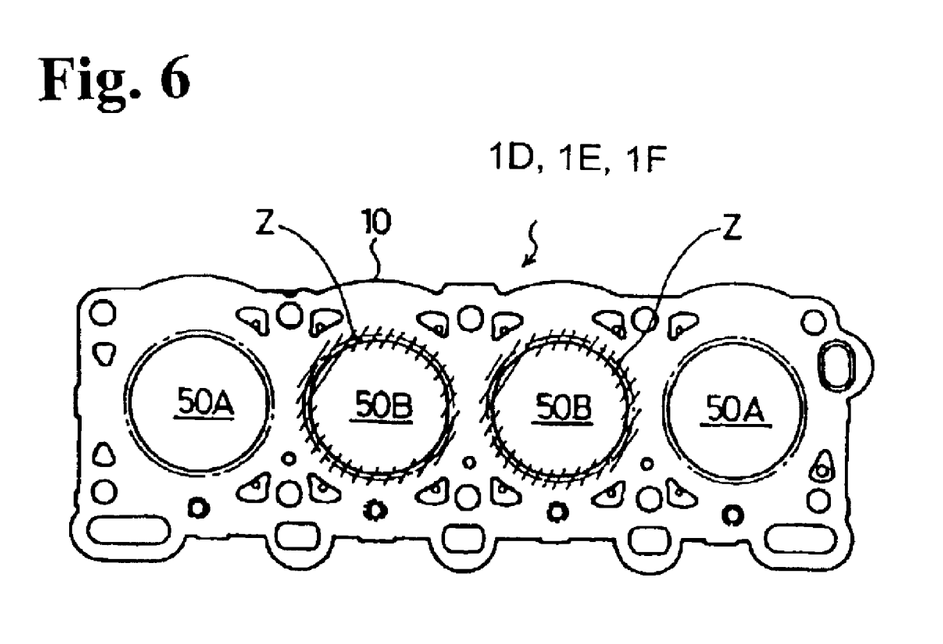
FIG. 6 is a plan view showing portions, where the heat load of the cylinder head gasket is high, of the third and fourth embodiments according to the present invention.

A cylinder head gasket of the third embodiment is applied to the one having cylinder bores 50A, 50B where the heat loads at the plural peripheral portions are different, as shown in FIG. 6.

Figure 5A:
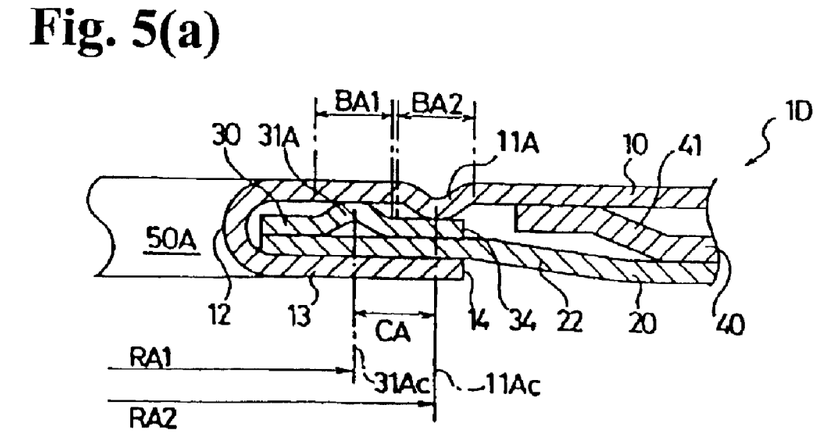
Figure 5B:
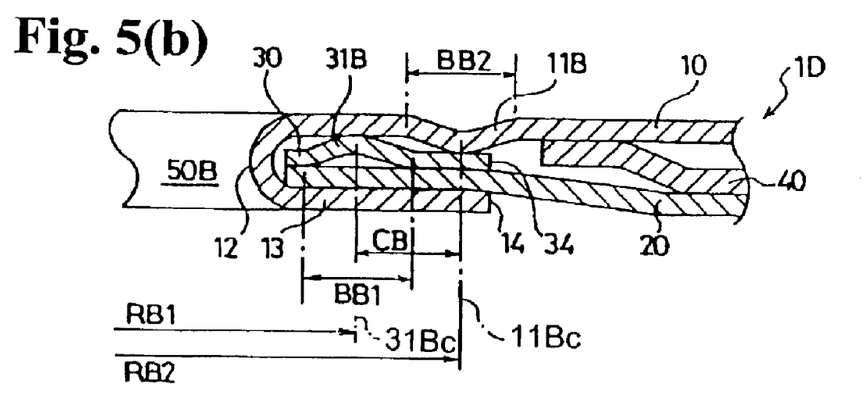

As shown in FIGS. 5(a), 5(b) and 6, in a cylinder head gasket 1D of the third embodiment, the surface pressure generated by the heat load is different depending on the positions of the cylinder bores 50A, 50B. More specifically, as shown in FIG. 6, in the cylinder bores 50A, 50B, 50B, 50A disposed in series, the heat load generated on the peripheral portions of the cylinder bores 50B located on the central side is higher than that of the cylinder bores 50A located on both sides.

In view of the above situation, the bead width BB1 of the inner peripheral side bead 31B and the bead width BB2 of the outer peripheral side bead 11B are made wider, at the peripheral portions of the cylinder bore 50B where the surface pressure due to the heat load becomes high, than the bead width BA1 of the inner peripheral side bead 31A and the bead width BA2 of the outer peripheral side bead 11A provided around the cylinder bore 50A where the surface pressure due to the heat load is low.

According to the structure, at the peripheral portions of the cylinder bores 50B where the surface pressure due to the heat load is high, the bead widths BB1, BB2 of the inner peripheral side bead 31B and the outer peripheral side bead 11B, facing each other inside the folded-back portion of the first surface plate 10, are widened. Thus, the bead rigidity is reduced, which results in reduction of the surface pressure.

With the reduction of the surface pressure, increase in the surface pressure due to high heat load and heat stress can be offset. Thus, it is possible to prevent the high surface pressure from being generated at the peripheral portions of the cylinder bores 50B, which results in suppression of the head depression.

Incidentally, as shown in FIGS. 5(a) and 5(b), the inner peripheral side beads 31A, 31B and the outer peripheral side beads 11A, 11B are positioned with proper clearances CA and CB, respectively, so that the foot portions thereof do not interfere with each other. However, it is set as, in FIG. 5(a), ((BA1+BA2))/2<CA), and in FIG. 5(b), ((BB1+BB2)/2>CB).

In FIG. 5(b), the distance RB2 between the center 11Bc of the outer peripheral side bead 11B and the center of the cylinder bore 50B is formed to be the same as the distance RA2 between the center 11Ac of the outer peripheral side bead 11A and the center of the cylinder bore 50A.

Figure 7A:
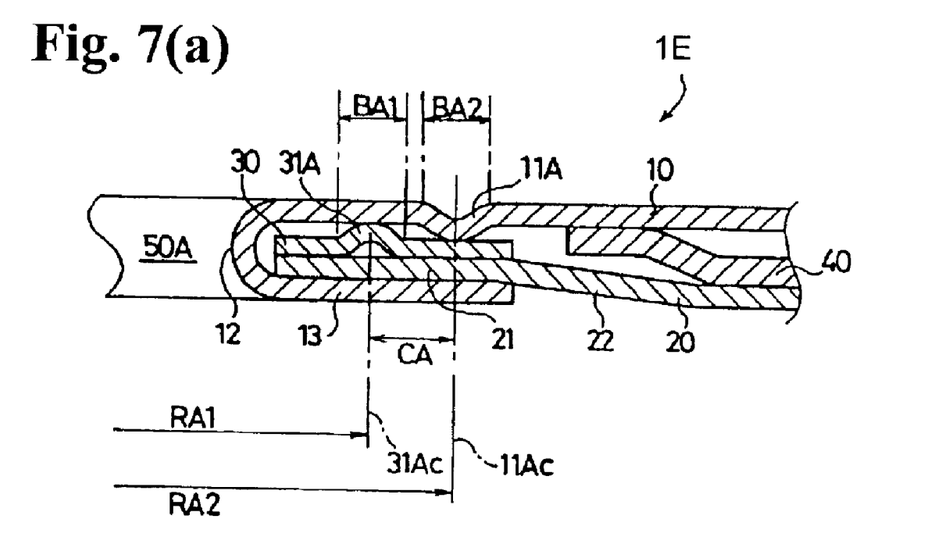
Figure 7B:
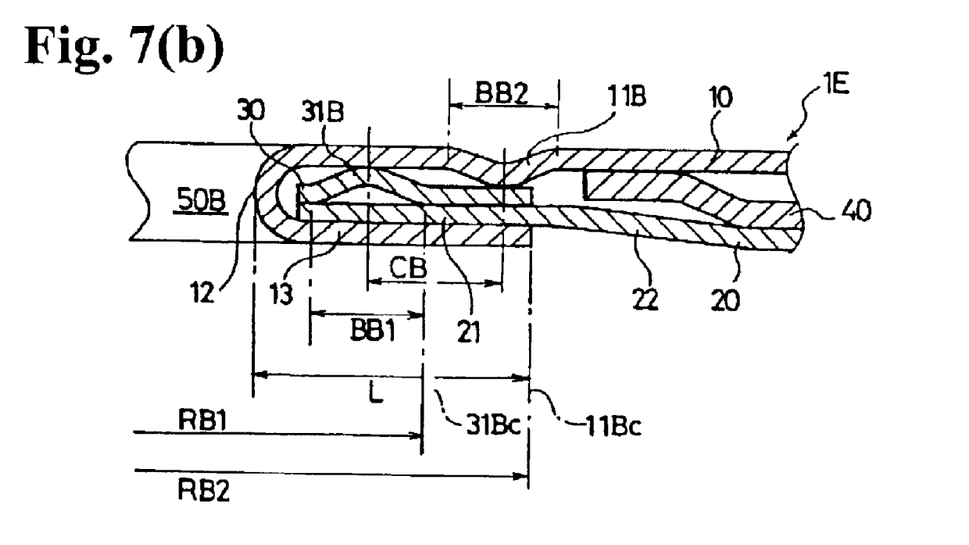

On the contrary, as shown in FIG. 7(b), as the bead widths BB1, BB2 of the respective beads 31B, 11B are increased, the distance RB2 between the center 11Bc of the outer peripheral side bead 11B and the center of the cylinder bore 50B is increased, so that the center 11Bc is shifted toward the outer peripheral side. Thus, a relationship of ((BB1+BB2)/2>CB) can be held.

In case of FIGS. 7(a) and 7(b), even if a cylinder head gasket 1E is strongly pressed during the operation of the engine, since the respective beads are separated, it is possible to prevent the foot portions of the respective beads from overlapping each other.

Fourth Embodiment

Next, a cylinder head gasket 1F of a fourth embodiment will be explained.

The cylinder head gasket 1F of the fourth embodiment, as shown in FIG. 6, is applied to the one having cylinder bores 50A, 50B where the heat load is different at the plural peripheral portions, in the same manner as in the third embodiment.

Figure 8A:
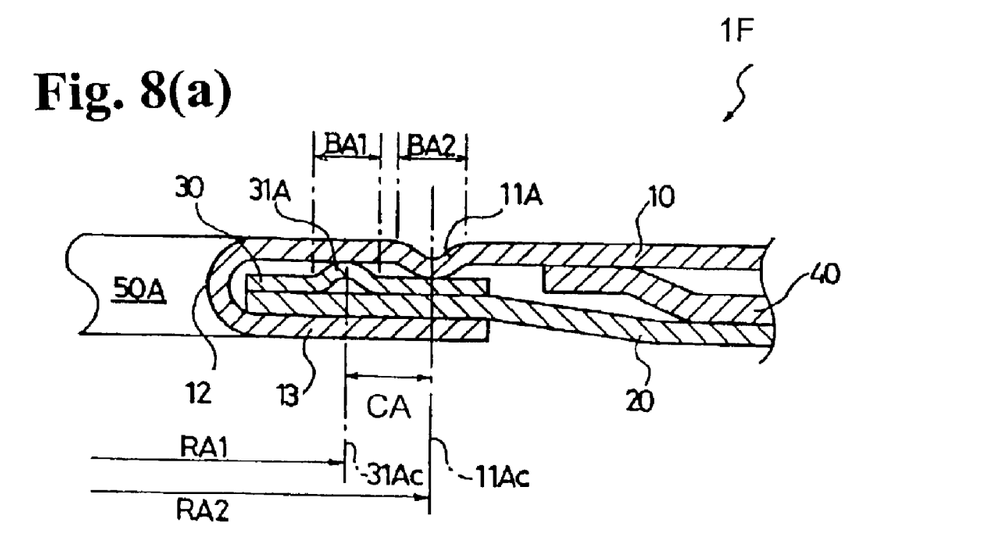
Figure 8B:
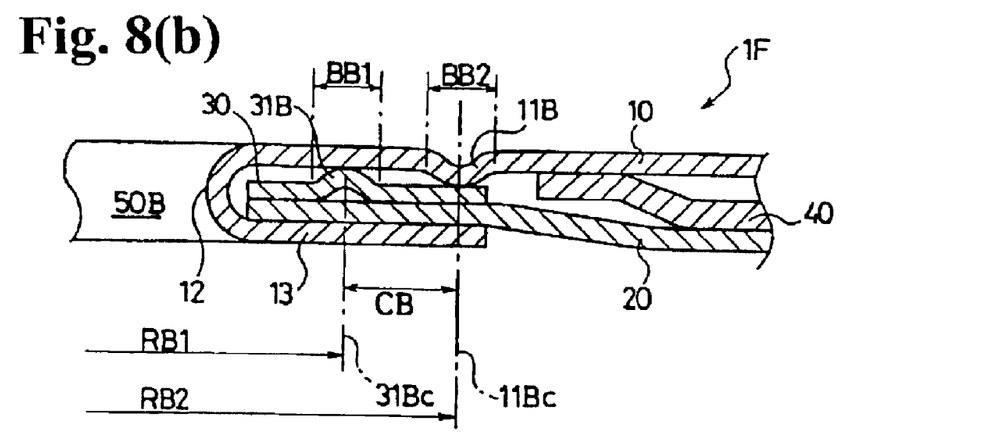

In the cylinder head gasket 1F of the fourth embodiment, as shown in FIG. 8(b), the distance CB between the center 31Bc of the inner peripheral side bead 31B and the center 11Bc of the outer peripheral side bead 11B is enlarged, instead of increasing the bead widths BB1 and BB2 with respect to the cylinder bores 50B, the heat load of the peripheral portions of which becomes high. Other structures of the fourth embodiment are the same as those of the third embodiment.

In the fourth embodiment, for the cylinder bores 50B where the heat load in the peripheral portions becomes high, the distance (clearance) CB between the two beads is widened, so that the space between the inner peripheral side bead 31B and the outer peripheral side bead 11B, facing each other inside the folded-back portion of the first surface plate 10, is widened. Thus, the compressing rigidity of the portion including the beads 31B, 11B is reduced, which results in reduction of the surface pressure.

With the reduction of the surface pressure, increase in the surface pressure generated by the heat load and heat stress at the peripheral portions of the cylinder bore 50B can be offset. Thus, it is possible to prevent the sealing ability from being deteriorated due to the mark formed on the engine member.

As explained above, according to the cylinder head gaskets of the present invention, the following effects can be obtained.

In the cylinder head gasket having a portion where a high heat load is locally generated at a peripheral portion of a cylinder bore to be sealed, with respect to the peripheral portion of the cylinder bore where the heat load and heat stress become locally high, the bead widths of the inner peripheral side bead and the outer peripheral side bead, facing each other inside a folded-back portion of the first surface plate, are locally enlarged. Thus, the rigidity of the beads of that portion can be reduced.

Also, in the cylinder head gasket having a portion where the heat load becomes locally high at the peripheral portion of a hole to be sealed, with respect to the peripheral portion of a cylinder bore where the heat load and heat stress are locally high, a distance between two beads, facing each other inside a folded-back portion of the first surface plate, is partially enlarged. Thus, the compressing rigidity at this portion can be reduced.

In the cylinder head gasket having holes to be sealed wherein the heat loads at the peripheral portions are different, the bead widths of the inner peripheral side bead and the outer peripheral side bead at the peripheral portion of the hole to be sealed where the heat load becomes high, are made wider than those of the inner peripheral side bead and the outer peripheral side bead at the peripheral portion of the hole to be sealed where the heat load is low. Thus, the rigidity of the bead can be reduced.

Also, in the cylinder head gasket having holes to be sealed wherein the heat load at the peripheral portion is different, the distance between the inner peripheral side bead and the outer peripheral side bead at the peripheral portion of the hole to be sealed where the heat load becomes high is made wider than that between the inner peripheral side bead and the outer peripheral side bead at the peripheral portion of the hole to be sealed where the heat load is low. Thus, the compressing rigidity of the bead can be reduced.

Therefore, at the portions where the sealing surface pressure becomes high due to the high heat load and heat stress, the bead rigidity and compressing rigidity can be reduced. Thus, it is possible to prevent the surface pressure at these portions of the bead from being increased, reduce the head press marks formed by the high surface pressure, and suppress the head depression.

While the invention has been explained with reference to the specific embodiments of the invention, the explanation is illustrative and the invention is limited only by the appended claims.

What is claimed is:

1. A cylinder head gasket for an internal combustion engine having a plurality of holes to be sealed, and high and low heat load portions around the holes to be sealed, comprising:
    a first metal plate having a base portion, first holes formed in the base portion corresponding to the holes to be sealed, first beads formed around the respective first holes, curved portions extending from the base portion to define the first holes, and flanges extending from the respective curved portions and located under the first beads,
    second metal plates, each being disposed between the base portion and the flange, and having a second hole and a second bead surrounding the second hole and extending toward the base portion above the flange, each of said second metal plates being a ring plate with the second bead disposed on each of the flanges under the first bead such that the second bead is spaced from the first bead not to contact each other when the gasket is compressed,
    a third metal plate disposed under the base portion of the first metal plate, and
    a fourth metal plate disposed between the base portion of the first metal plate and the third metal plate without overlapping the second metal plate,
    wherein at least one of a distance between the first and second beads and a width of at least one of the first and second beads at the high heat load portion is formed to be greater than at least one of a distance between the first and second beads and a width of at least one of the first and second beads at the low heat load portion to thereby reduce a surface pressure at the high heat load portion when the gasket is compressed.

2. A cylinder head gasket according to claim 1, wherein one of the first holes has high and low heat load portions corresponding to those of the engine, the widths of the first and second beads at the high heat load portion in the one first hole being formed to be greater than the widths of the first and second beads at the low heat load portion in the one first hole.

3. A cylinder head gasket according to claim 1, wherein one of the first holes have high and low heat load portions corresponding to those of the engine, the d stance between the first and second beads at the high heat load portion in one first hole being greater than the distance between the first and second beads at the low heat load portion in the one first hole.

4. A cylinder head gasket according to claim 3, wherein at least one of the widths of the first and second beads at the high heat load portion in the one first hole is greater than the widths of the first and second beads at the low heat load portion in the one first hole.

5. A cylinder head gasket according to claim 1, wherein said first holes have separate high and low heat load portions corresponding to those of the engine, the widths of the first and second beads at the high heat load portion in one first hole being greater than the widths of the first and second beads at the low heat load portion in another first hole.

6. A cylinder head gasket according to claim 1, wherein said first holes have separate high and low heat load portions, the distance between the first and second beads at the high heat load portion in one first hole being greater than the distance between the first and second beads at the low heat load portion in another first hole.

7. A cylinder head gasket according to claim 6, wherein at least one of the widths of the first and second beads at the high heat load portion is greater than the widths of the first and second beads at the low heat load portion.

8. A cylinder head gasket according to claim 1, wherein the first bead has the width and height same as those of the second bead adjacent thereto.

9. A cylinder head gasket according to claim 1, wherein said first and second beads are form such that a distance between a center of the first bead and a center of the second bead is greater than a half of a sum of the width of the first bead and the width of the second bead.

10. A cylinder head gasket according to claim 1, wherein the first metal plate is made thicker than the second metal plate.

11. A cylinder head gasket according to claim 1, wherein said first and second beads change the widths to have a maximum width less than twice of a minimum width.

* * * * *